US006308686B1

(12) United States Patent
Mammarella et al.

(10) Patent No.: US 6,308,686 B1
(45) Date of Patent: Oct. 30, 2001

(54) INTAKE MANIFOLD WITH INTERNAL FUEL RAIL AND INJECTORS

(75) Inventors: John R. Mammarella, Windsor; John F. Marentette, Tecumseh, both of (CA); Christine C. Worrel, Madison Heights, MI (US); Gary I. Kennedy, Tacumseh (CA)

(73) Assignee: Siemens Canada Limited, Tilbury (CA)

( * ) Notice: Subject to any disclaimer, the term of this patent is extended or adjusted under 35 U.S.C. 154(b) by 0 days.

(21) Appl. No.: 09/690,283

(22) Filed: Oct. 17, 2000

Related U.S. Application Data

(60) Provisional application No. 60/166,399, filed on Nov. 18, 1999, and provisional application No. 60/205,732, filed on May 19, 2000.

(51) Int. Cl.[7] ............................. F02M 33/04; F02M 35/10
(52) U.S. Cl. ..................... 123/470; 123/184.21; 123/456
(58) Field of Search ............................. 123/456, 468, 123/469, 470, 184.21

(56) References Cited

U.S. PATENT DOCUMENTS

| | | |
|---|---|---|
| 2,488,096 | 11/1949 | Newman . |
| 2,509,093 | 5/1950 | Field . |
| 4,702,202 * | 10/1987 | Hensel et al. ..................... 123/456 |
| 4,776,313 | 10/1988 | Freismuth et al. . |
| 4,805,564 | 2/1989 | Hudson, Jr. . |
| 5,003,933 | 4/1991 | Rush, II et al. . |
| 5,163,406 | 11/1992 | Daly et al. . |
| 5,189,782 | 3/1993 | Hickey . |
| 5,209,204 | 5/1993 | Bodenhausen et al. . |
| 5,211,149 | 5/1993 | DeGrace, Jr. . |
| 5,218,936 | 6/1993 | Pritz et al. . |
| 5,295,468 | 3/1994 | Blessing et al. . |
| 5,323,749 | 6/1994 | Gras et al. . |
| 5,349,930 | 9/1994 | Maruyama et al. . |
| 5,353,767 | 10/1994 | Carbone et al. . |
| 5,357,931 | 10/1994 | Semence . |
| 5,447,140 | 9/1995 | Brisbane et al. . |
| 5,598,824 | 2/1997 | Treusch et al. . |
| 5,743,235 * | 4/1998 | Lueder .................................. 123/468 |
| 5,816,213 * | 10/1998 | Gaviani et al. ....................... 123/456 |
| 6,098,586 * | 8/2000 | Bloomer ........................... 123/184.21 |
| 6,167,855 * | 1/2001 | Mammarella et al. ......... 123/184.21 |

* cited by examiner

Primary Examiner—Thomas N. Moulis

(57) ABSTRACT

An intake manifold includes an upper shell, a lower shell, and a middle shell that interconnects the upper and lower shells. The lower shell has a plurality of longitudinally spaced shell ports. Each shell port is adapted for installation over a corresponding intake port for an engine cylinder head. The upper shell has a plurality of runners that are used to guide air to the shell ports. The middle shell has a plurality of channels that interconnect the runners and the shell ports such that air can flow through the runner to the cylinder intake port. Fuel injector pockets are formed within the upper, middle, and lower shells with each of the pockets having an injector opening in communication with the corresponding shell port. An internal fuel rail, formed between the upper and middle shells, supplies fuel to each of the injector pockets. A fuel injector is installed into each injector pocket such that the injectors are substantially enclosed within the manifold. An internal wire harness rail, formed between the upper and middle shells, supports a wire harness that electrically connects each of the injectors to a power supply.

19 Claims, 4 Drawing Sheets

INTAKE MANIFOLD WITH INTERNAL FUEL RAIL AND INJECTORS

The present application claims priority to provisional application Ser. No. 60/166,399 filed on Nov. 18, 1999 and to provisional application Ser. No. 60/205,732 filed on May 19, 2000.

BACKGROUND OF THE INVENTION

1. Field of the Invention

This invention relates to an air intake manifold and method for assembly thereof where the intake manifold includes an internal fuel rail and wire harness that allows fuel injectors to be installed inside the manifold to form a subassembly.

2. Related Art

Internal combustion engines operate by burning a mixture of fuel and air in a cylinder containing a piston. Engine power is provided by a continuous cycle that takes place inside the engine. First, as the piston moves downward, an inlet valve opens and a mixture of fuel and air is sucked into the cylinder chamber. The valve closes and the piston moves up to compress the mixture. An electric spark plug produces a spark that ignites the fuel, forcing the piston back down. Finally, an outlet valve opens and the piston rises back up to release the exhaust gases out of the cylinder. The cycle continually repeats itself until the engine is shut down.

The engines use fuel injectors to control injection of fuel into the engine cylinders. An air intake manifold is fastened to the engine to provide a system of guides or runners that supply air to be combined with the fuel to form a mixture. The fuel injectors are cylindrical members that are typically mounted to a fuel rail. In most applications, the fuel rail is an external member that is fastened to the outside of the air intake manifold. The fuel injectors are received into bores formed along the manifold.

In some applications, the fuel rail is formed inside the manifold to eliminate attachment hardware and assembly cost. One such manifold is shown in U.S. Pat. No. 5,682,859 issued on Nov. 4, 1997 for "Method and Arrangement For Mounting Fuel Rails" and assigned to the assignee of the present invention. In this arrangement the fuel injector is separately installed externally to the manifold by installing one end of the injector for communication with the fuel rail with the other end of the injector installed into the runner for communication with the intake port for the cylinder. This mounting arrangement requires special seals and the assembly process can be difficult and time consuming. Further, since the fuel injectors are mounted outside of the manifold, the injectors are noisy and cause unwanted vibrations.

In some cases, the traditional mechanical linkage between the accelerator pedal and the engine throttle is replaced by electronic throttle control (ETC). In ETC configurations, an electric signal controls the position of the engine throttle and fuel supply therefor. Wiring harnesses are used to connect the fuel injectors to a power supply for the ETC system. Typically, these wiring harnesses are mounted externally to the manifold, thus exposing the harness to potential damage and environmental contaminants.

Thus, it is desirable to have a mounting arrangement for a fuel injector where the injector can be mounted inside a manifold that has an internal fuel rail to eliminate special mounting hardware and unwanted noise. Further it would be desirable to have such a manifold where wiring needed for electronic throttle control could be easily integrated into the manifold.

SUMMARY OF THE INVENTION

In a disclosed embodiment of this invention, an intake manifold for mounting to an internal combustion engine includes a lower shell, an upper shell, and a middle shell sandwiched between the lower and upper shells. The shells are formed to include an internal fuel rail that allows fuel injectors to be easily installed within the manifold to form a subassembly. The lower shell has a plurality of longitudinally spaced shell ports. Each shell ports is adapted for installation over a corresponding intake port on an engine cylinder head. The upper shell has a plurality of runners that guide air to the shell ports. The middle shell has channels that interconnect the runners and the shell ports. Fuel injector pockets are formed within the upper, middle, and lower shells with each of the pockets having an injector opening in communication with the corresponding shell port. An internal fuel rail is formed between the upper and middle shells for supplying fuel to each of the injector pockets.

In a preferred embodiment, a fuel injector is inserted into each one of the injector pockets to form an intake manifold and injector subassembly that can be easily attached to an internal combustion engine. After the upper, middle, and lower shells are sealed together, the fuel injectors are installed into the injector pockets via the shell ports.

In a further preferred embodiment, an internal wire harness rail is formed between the upper and middle shells for supporting a wire harness that electrically connects each of the injectors to a power supply. The electrical connection is required for use in a vehicle having electronic throttle control.

A method for assembling an air intake manifold includes the steps described below. The upper shell is provided with a plurality of upper fuel injector pocket portions, a middle shell is provided with a plurality of middle fuel injector pocket portions, and a lower shell is provided with a plurality of lower fuel injector pocket portions. A wire harness assembly is installed between the upper and middle shells. The upper shell is connected to the middle shell such that the upper fuel injector pocket portions are aligned with the middle fuel injector pocket portions. The lower shell is connected to the middle shell such that the middle fuel injector pocket portions are aligned with the lower fuel injector pocket portions, thus forming a plurality of fuel injector pockets that extend through the upper, middle, and lower shells. A fuel injector is installed into each of the injector pockets to form a manifold and injector subassembly.

The subject intake manifold and method of assembly therefor offer an improved, inexpensive, and more compact manifold where fuel injectors can be pre-assembled into the manifold for simplified mounting of the manifold onto an engine and for noise reduction.

These and other features of the present invention can be best understood from the following specification and drawings, the following of which is a brief description.

DETAILED DESCRIPTION OF AN EXEMPLARY EMBODIMENT

Figure 1:
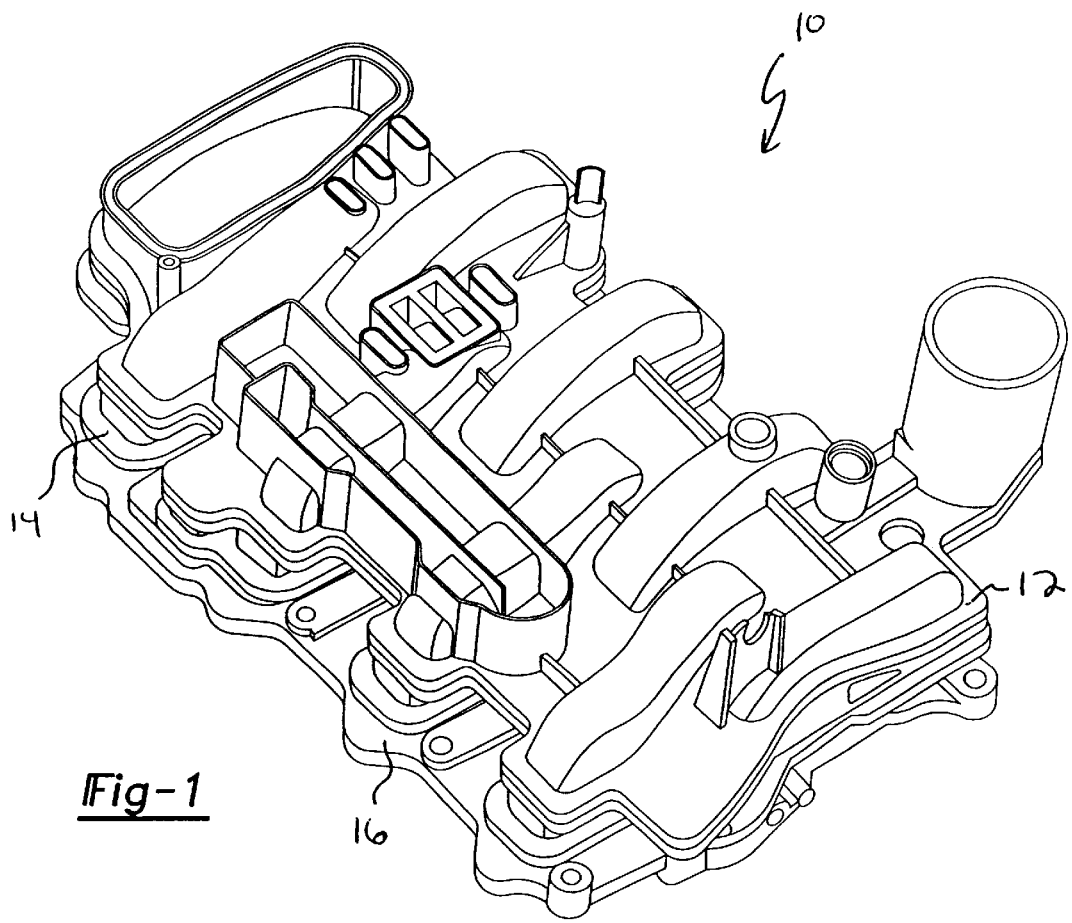
FIG. 1 is a perspective view of the subject intake manifold as assembled.

An intake manifold is shown generally at 10 in FIG. 1. The intake manifold 10 is mounted to an internal combustion engine (not shown) to supply air for combination with fuel to form a combustible mixture used to power the engine. The intake manifold includes an upper shell 12, a middle shell 14, and a lower shell 16. The middle shell 14 is sandwiched between the upper 12 and lower 16 shells during assembly to provide a sealed assembly.

Figure 2:
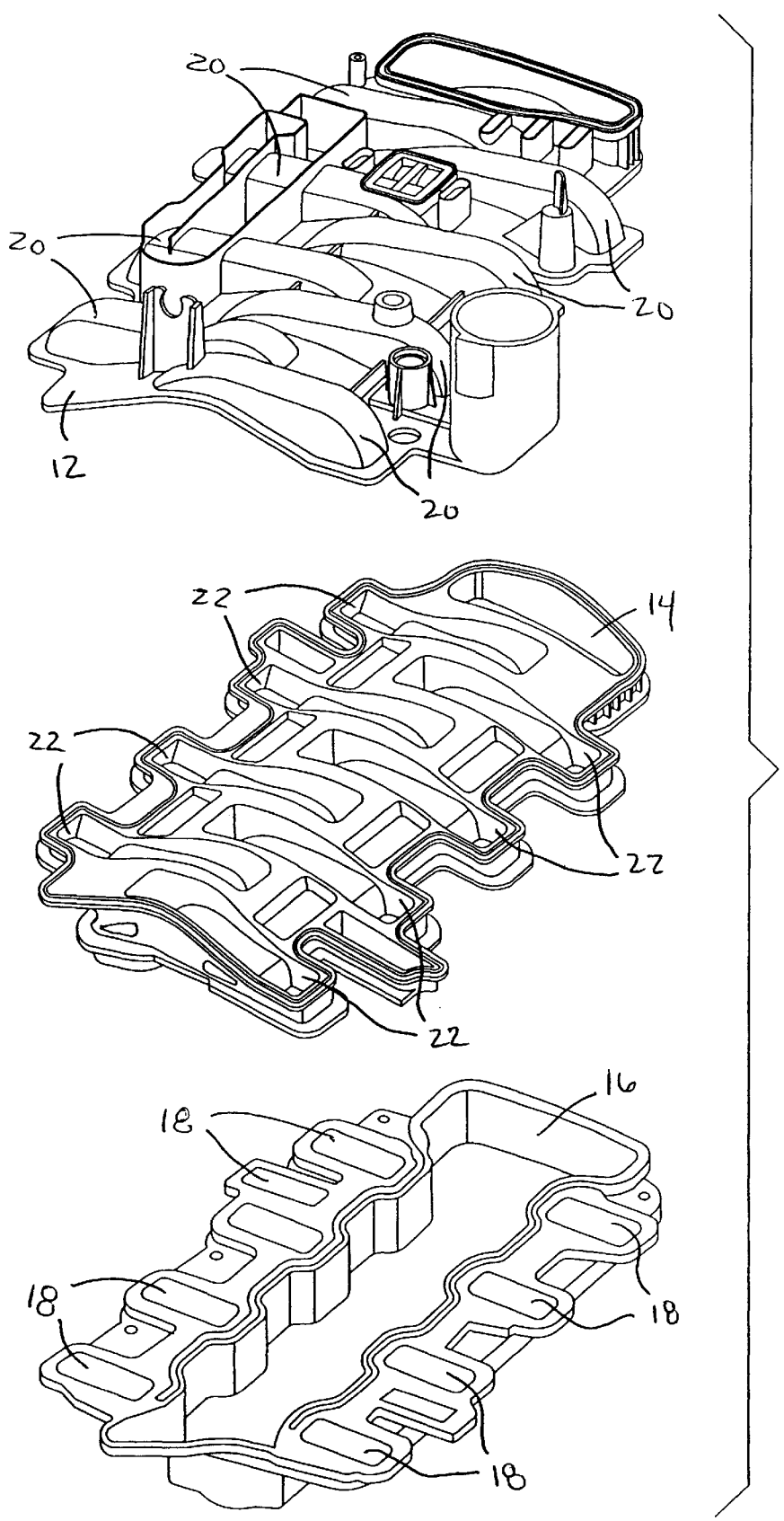
FIG. 2 is an exploded view of the manifold of shown in FIG. 1.

As shown in FIG. 2, the lower shell 16 includes a plurality of longitudinally spaced shell ports 18. Each of the ports 18 is adapted for installation over a corresponding intake port for the engine. The upper shell 12 includes a plurality of runners 20 that are used to guide air to the shell ports 18 as is known in the art. The middle shell 14 is installed between the lower 16 and upper 12 shells and includes a plurality of channels 22 that interconnect the runners 20 and the shell ports 18.

Figure 4:
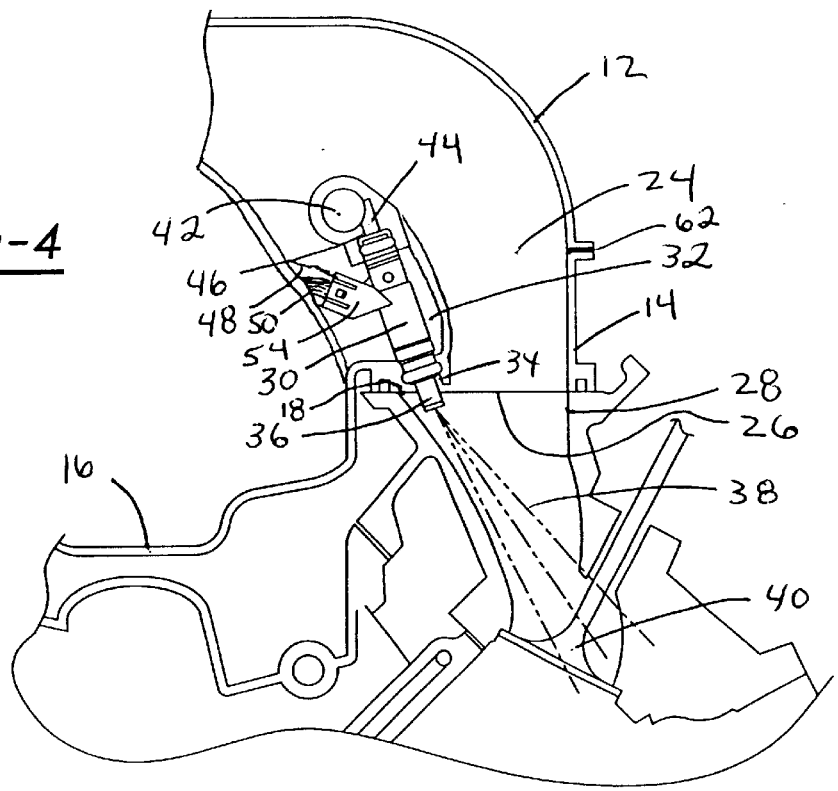
FIG. 4 is a cross-sectional view of one embodiment of the manifold, partially cut-away, showing an installed fuel injector.

Once the shells 12, 14, 16 are assembled together, a plurality of air supply guides 24 extend are formed to supply air for combination with the fuel. As shown in FIG. 4, the flows through the runners 20 and through the channels 22 to the intake 26 of the engine cylinder head 28. A plurality of air supply guides 24 are provided in the intake manifold 10. As indicated in FIGS. 1 and 2, preferably eight (8) supply guides 24 are provided for mounting over eight (8) engine cylinder heads 28 (only one cylinder head is shown).

A fuel injector 30 is installed within the manifold 10 adjacent to each one of the runners 20. A plurality of fuel injector pockets 32 are formed within the upper 12, middle 14, and lower 16 shells to receive the fuel injectors 30. Each of the pockets 32 has an injector opening 34 in communication with the corresponding shell port 18. A tip 36 of the fuel injector 30 extends through the injector opening 34 such that fuel 38 can be sprayed toward an engine valve 40 installed within the cylinder head 28 via the shell port 18.

An internal fuel rail 42 is formed between the upper 12 and middle 14 shells for supplying fuel 38 to each of the injector pockets 32. The injector pockets 32 have an upper opening 44 in communication with the fuel rail 42. An upper end 46 of the fuel injector 30 extends into the upper opening 44 and is in fluid communication with the fuel rail 42. Fuel 38 flows through the fuel rail 42 into each of the fuel injectors 30 such that the fuel 38 can be sprayed from the fuel injector tip 36. The fuel 38 sprayed from the tip 36 is mixed with air supplied via the runners 20 to form a combustible mixture that is supplied to each cylinder 28 via the corresponding shell port 18.

One fuel injector 30 is received into one of the injector pockets 32 such that the injectors 30 are substantially enclosed within the upper 12, middle 14, and lower 16 shells. Each injector pocket 32 is formed adjacent to each one of the runners 20 so that the fuel 38 is easily mixed with the air supply. Enclosing the injectors 30 within the manifold 10 in such a manner provides a compact subassembly that can be easily attached to an engine by any of various methods known in the art. Another advantage of installing the injectors 30 within the intake manifold 10 is that noise is significantly reduced.

Figure 3:
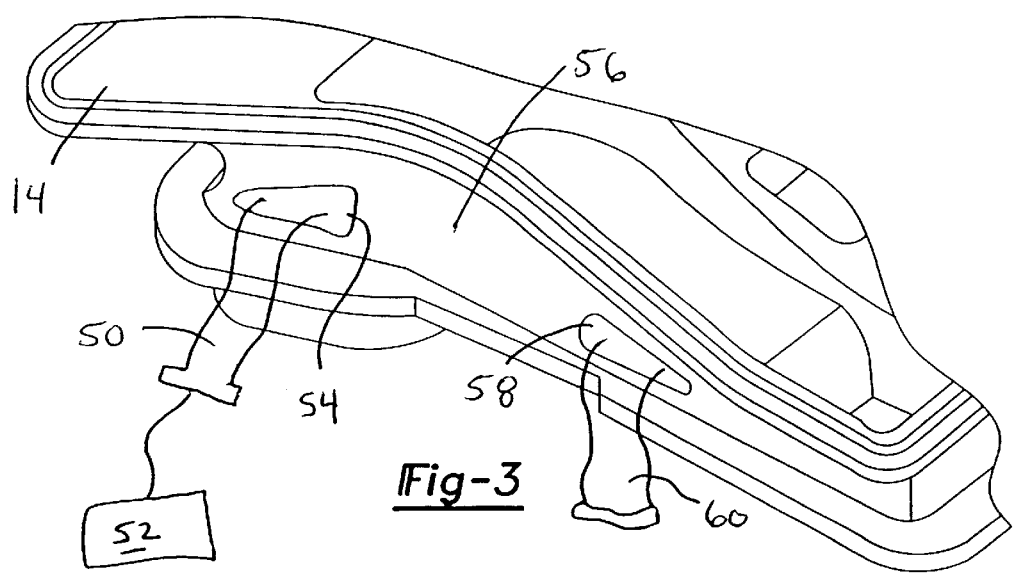
FIG. 3 is a magnified view, partially cut-away, showing the fuel rail and wiring harness external attachment ports.

For applications using electronic throttle control (ETC), an internal wire harness rail 48 is formed between the upper 12 and middle 14 shells for supporting a wire harness 50 that electrically connects each of the injectors 30 to a power supply 52, shown schematically in FIG. 3. Each fuel injector 30 has an electrical connector 54 that interconnects the injector 30 with the wiring harness 50. The power supply 52 can any of various power supply units known in the art and is preferably mounted externally from the manifold 10. In the preferred embodiment, the power supply 52 is the vehicle battery.

As shown in FIGS. 2 and 3, an external wire port 54 is formed on one side 56 of the middle shell 14. The wire harness 50 is connected to each injector 30 via the electrical connector 54 and through the wire harness rail 48 formed within the manifold 10. The wire harness 50 extends out from the external wire port 54 to be connected to the power supply 52.

Similarly, an external fuel port 58 is defined on one side 56 of the middle shell 14 to which an external fuel supply member 60 is connected for supplying fuel 38 to the fuel rail 42.

In one embodiment, shown in FIG. 4, the fuel rail 42 has a circular cross sectional shape and the wire harness rail 48 is orientated transversely with respect to the fuel injector 30. The orientation of the fuel injector 30 within the pocket 32 provides a bent stream where the runner entrance is more vertical to shell port 18. In this embodiment, the injectors 30 are installed from the top of the manifold 10. Thus, the upper shell 12 is not attached to the middle shell 14 until after the injectors 30 have been installed into each pocket 32. A seal 62 is placed between the upper 12 and middle 14 shells to provide a protected environment for the injectors 30. If the injectors 30 require service then the upper shell 12 must be removed to allow access to the injectors.

Figure 5:
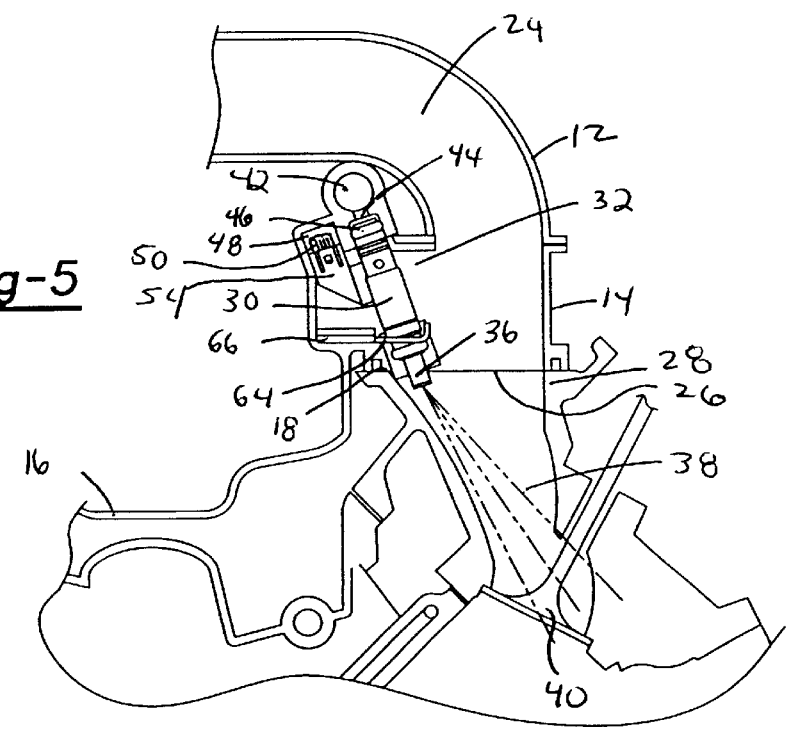
FIG. 5 is a cross-sectional view of an alternate embodiment of the manifold, partially cut-away, showing an installed fuel injector.

In an alternate embodiment. shown in FIG. 5, the injectors 30 are installed from the bottom of the manifold after all of the shells 12, 14, 16 are assembled together. Preferably, the shells are formed from a plastic composite material, such as a nylon plastic, and are welded together. This configuration also provides a bent stream spray. The internal wiring rail 48 is in a generally parallel orientation with respect to the fuel injector body. This configuration eliminates the need for seals between the shells 12, 14, 16.

One advantage of having the internal fuel rail 42 is that the fuel rail 42 can also be formed from a plastic material because the internal configuration does not allow fuel to permeate to the external environment.

Once the injectors 30 are installed within the manifold 10 a clip 64 is inserted through a slot 66 formed within the manifold to hold the fuel injector 30 in place. While a clip 64 is preferred, other attachment methods known in the art could be used to mount the injector 30 within the pocket 32.

Figure 6:
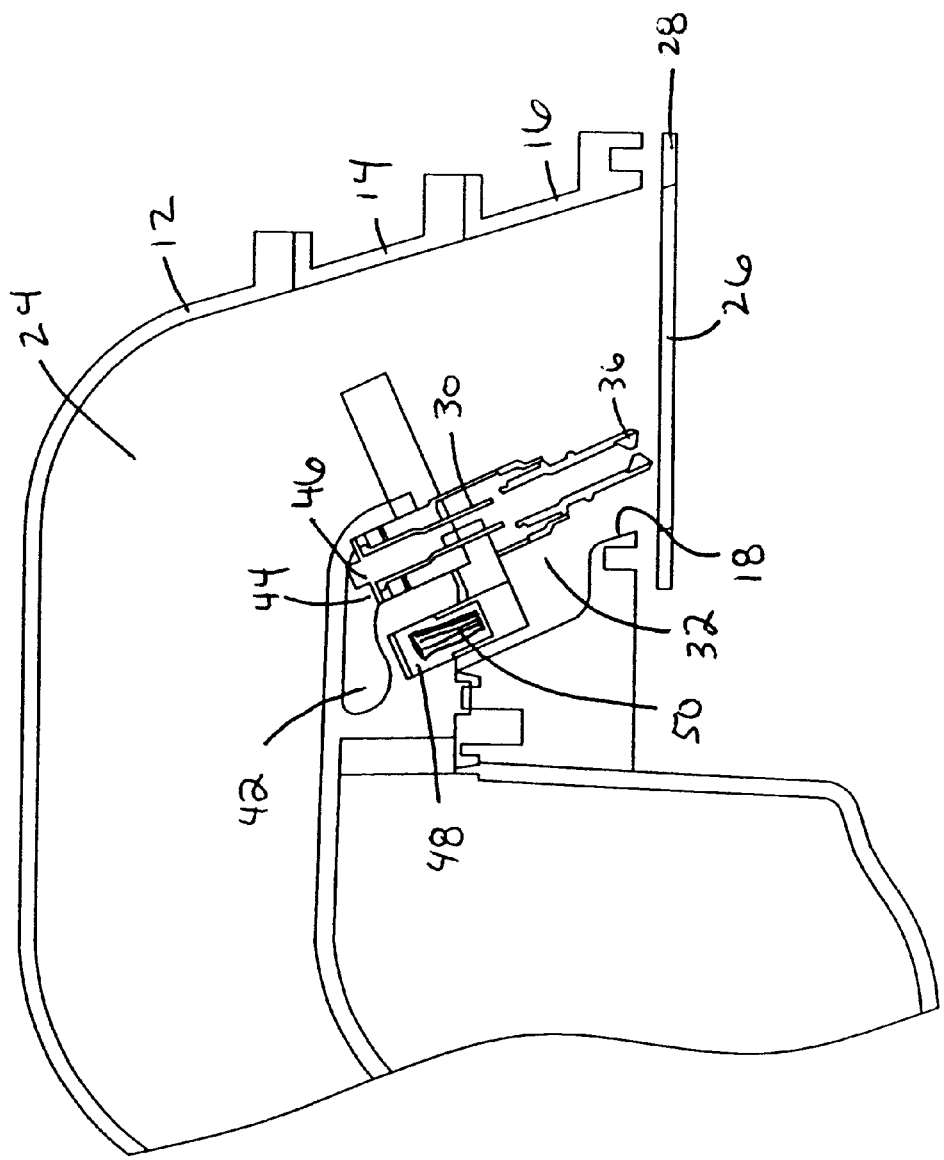
FIG. 6 is a cross-sectional view of an alternate embodiment of the manifold, partially cut-away, showing an installed fuel injector.

In another embodiment, shown in FIG. 6, the intake manifold 10 has a fuel rail 42 with a generally triangular cross-sectional shape. The wiring rail 48 is also generally parallel to the fuel injector body 30. This configuration allows the injectors 30 to be installed within the pockets 32 from underneath the manifold after the shells 12, 14, 16 are assembled.

The method for assembling the air intake manifold 10 includes the following steps. An upper shell 12 is provided with an plurality of upper fuel injector pocket portions. A middle shell 14 is provided with a plurality of middle fuel injector pocket portions and a lower shell 16 is provided with a plurality of lower fuel injector pocket portions. A wire harness assembly 50 is installed between the upper 12 and middle 14 shells. The upper shell 14 is connected to the middle shell 14 such that the upper fuel injector pocket portions are aligned with the middle fuel injector pocket portions. The lower shell 16 is connected to the middle shell 14 such that the middle fuel injector pocket portions are aligned with the lower fuel injector pocket portions to form a plurality of fuel injector pockets 32 that extend through the upper 12, middle 14, and lower 16 shells. Next, a fuel injector 30 is installed into each of the injector pockets 32 to form a manifold and injector subassembly.

As discussed above, the lower shell 16 includes a plurality of shell ports 18 in communication with the injector pockets 32. The fuel injectors 30 are inserted into the injector pockets 32 via the corresponding shell ports 18. Once the manifold and injector subassembly is formed, the assembly is mounted to an internal combustion engine. Each one of the shell ports 18 is aligned with a corresponding engine cylinder head port 28. An internal fuel rail 42 extends longitudinally between the upper 12 and middle 14 shells to supply fuel to the injector pockets 32.

As discussed above, the fuel rail 42 is molded as part of the intake manifold shells 12, 14, 16. The wiring harness 50 is laid in the wiring rail 48 formed within the manifold and the shells 12, 14, 16 are then welded together. After the manifold is fully welded, the injectors 30 are assembled into the manifold 10 via the shell ports 18. As the injectors 30 are installed, the injectors 30 are connected to the fuel rail 42 and wiring connectors 54 already formed within the manifold 10. Next, the connections for fuel intake ports any required test ports can be made. Caps (not shown) can be for the ends of the fuel rail can be added to complete the subassembly for shipping.

The subject air intake manifold 10 incorporates the fuel rail 42, injectors 30, and wiring harness 50 for the injectors 30, within a welded plastic composite shell assembly 12, 14, 16. This allows the injectors 30 to be installed within the manifold 10 to for a subassembly that is easily installed onto an engine. Installing the injectors 30 within the manifold also reduces noise.

Although a preferred embodiment of this invention has been disclosed, it should be understood that a worker of ordinary skill in the art would recognize many modifications come within the scope of this invention. For that reason, the following claims should be studied to determine the true scope and content of this invention.

I claim:

1. An intake manifold for mounting to an internal combustion engine comprising:
    a lower shell defining a plurality of longitudinally spaced shell ports, each of said ports being adapted for installation over a corresponding intake port for an engine cylinder head;
    an upper shell including a plurality of runners for guiding air to said shell ports;
    a middle shell sandwiched between said lower and upper shells and including a plurality of channels for interconnecting said runners and said shell ports;
    a plurality of fuel injector pockets formed within said upper, middle, and lower shells with each of said pockets having an injector opening in communication with said corresponding shell port; and
    an internal fuel rail formed between said upper and middle shells for supplying fuel to each of said injector pockets.

2. An intake manifold according to claim 1 wherein said injector pockets have an upper opening in communication with said fuel rail.

3. An intake manifold according to claim 2 including a plurality of fuel injectors wherein one of said injectors is received into one of said injector pockets such that said injectors are substantially enclosed within said upper, middle, and lower shells.

4. An intake manifold according to claim 3 wherein one of said injector pockets is formed adjacent to each one of said runners.

5. An intake manifold according to claim 3 including an internal wire harness rail formed between said upper and middle shells for supporting a wire harness that electrically connects each of said injectors to a power supply.

6. An intake manifold according to claim 5 including an external wire port defined on one side of said middle shell through which said wire harness is connected to the power supply.

7. An intake manifold according to claim 2 including an external fuel port defined on one side of said middle shell to which an external fuel supply member is connected for supplying fuel to said fuel rail.

8. An intake manifold for mounting to an internal combustion engine comprising:
    a lower shell defining a plurality of longitudinally spaced shell ports, each of said ports being adapted for installation over a corresponding intake port for an engine cylinder head;
    an upper shell including a plurality of runners for guiding air to said shell ports;
    a middle shell sandwiched between said lower and upper shells and including a plurality of channels for interconnecting said runners and said shell ports;
    a plurality of fuel injector pockets formed within said upper, middle, and lower shells with each of said pockets having an injector opening in communication with said corresponding shell port;
    a plurality of fuel injectors wherein one of said injectors is received into each one of said injector pockets; and
    an internal wire harness rail formed between said upper and middle shells for supporting a wire harness that electrically connects each of said injectors to a power supply.

9. An intake manifold according to claim 8 wherein said fuel injectors are substantially enclosed within said upper, middle, and lower shells.

10. An intake manifold according to claim 8 including a fuel rail formed between said upper and middle shells for supplying fuel to each of said injector pockets.

11. An intake manifold according to claim 10 wherein said injector pockets have an upper opening in communication with said fuel rail.

12. An intake manifold according to claim 11 including an external fuel port defined on one side of said middle shell to which an external fuel supply member is connected for supplying fuel to said fuel rail.

13. An intake manifold according to claim 8 including an external wire port defined on one side of said middle shell through which said wire harness is connected to the power supply.

14. A method for assembling an air intake manifold comprising the steps of:
    providing an upper shell with an plurality of upper fuel injector pocket portions, a middle shell with a plurality of middle fuel injector pocket portions, and a lower shell with a plurality of lower fuel injector pocket portions;
    installing a wire harness assembly between the upper and middle shells;

connecting the upper shell to the middle shell such that the upper fuel injector pocket portions are aligned with the middle fuel injector pocket portions;

connecting the lower shell to the middle shell such that the middle fuel injector pocket portions are aligned with the lower fuel injector pocket portions to form a plurality of fuel injector pockets that extend through the upper, middle, and lower shells;

installing a fuel injector into each of the injector pockets to form a manifold and injector subassembly.

15. A method according to claim 14 wherein the lower shell includes a plurality of shell ports in communication with the injector pockets and including the step of inserting the fuel injector into the injector pocket via the corresponding shell port.

16. A method according to claim 15 including the step of mounting the manifold and injector subassembly to an internal combustion engine.

17. A method according to claim 16 including the step of aligning each one of the shell ports with a corresponding engine cylinder head port.

18. A method according to claim 14 including the step of providing an internal fuel rail extending longitudinally between the upper and middle shells for supplying fuel to the injector pockets.

19. A method according to claim 14 including the step of connecting the fuel injector to the wiring harness subsequently to connection the upper shell to the middle shell and the lower shell to the middle shell.

* * * * *